J. F. LOUGHRAN.
TREAD FOR AUTOMOBILE TIRES.
APPLICATION FILED JAN. 10, 1917.
1,292,826.
Patented Jan. 28, 1919.
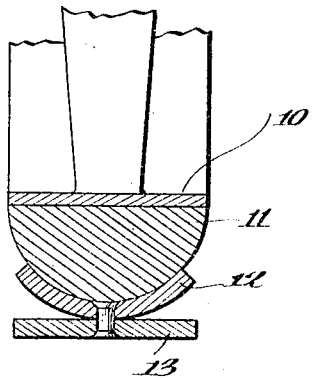
Inventor.
J. F. Loughran
By Fred P Lorrie
his Atty

UNITED STATES PATENT OFFICE.

JOHN F. LOUGHRAN, OF CHEHALIS, WASHINGTON.

TREAD FOR AUTOMOBILE-TIRES.

1,292,826.  Specification of Letters Patent.  Patented Jan. 28, 1919.

Application filed January 10, 1917. Serial No. 141,597.

*To all whom it may concern:*

Be it known that I, JOHN F. LOUGHRAN, a citizen of the United States, and a resident of Chehalis, in the county of Lewis and State of Washington, have invented certain new and useful Improvements in Treads for Automobile-Tires, of which the following is a full, true, and exact specification.

My invention relates to treads for automobile tires, and its object is to provide a novel and improved type of metallic tread portion.

The invention also comprehends improvements in the details of construction and arrangement of parts which will be hereinafter described and particularly pointed out in the claim.

In the drawing, the figure represents a section of a solid rubber tire equipped with my improved metallic tread.

10 indicates a wheel rim having a rubber tire 11, semi-circular in cross section, and provided on its periphery or tread surface with an endless curved intermediate member 12, to which is loosely riveted an endless tread member 13, flat in cross-section and of resilient spring material. In use the wear is taken by the member 13, which has a slight independent movement with respect to the member 12, due to its loose rivet connection which reduces excessive wear on the rubber tire.

The loose rivet connection provides a slight lateral movement between the members 12 and 13, due to which, and the resiliency of the material of member 13, the latter will, under heavy loading, somewhat conform to the member 12 in such a way to more evenly distribute the pressure of the wheel against the surface of the road.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent is:—

The combination with a tire of an endless metallic intermediate member of curved cross section to fit the outside of the said tire, and an endless and resilient circular tread member of flat cross section which fits the periphery of the said intermediate member at its greatest diameter and is loosely riveted to the said intermediate member whereby a metallic tread is provided which has a limited movement with respect to the said intermediate member and the tire.

JOHN F. LOUGHRAN.

Copies of this patent may be obtained for five cents each, by addressing the "Commissioner of Patents, Washington, D. C."